Patented June 12, 1951

2,556,848

UNITED STATES PATENT OFFICE 2,556,848

PHOSPHORUS SULFIDE TREATED PHENOL SULFONIC ACID SALTS

John G. McNab, Cranford, and Dilworth T. Rogers, Summit, N. J., assignors to Standard Oil Development Company, a corporation of Delaware No Drawing. Original application June 9, 1945, Serial No. 598,640. Divided and this application November 27, 1948, Serial No. 62,422

5 Claims. (Cl. 260—137)

This invention relates to a new class of organic compounds containing sulfur, phosphorus, and a metal. These compounds are useful as stabilizing agents for liquid petroleum products.

This is a division of application Serial Number 598,640, filed June 9, 1945, now issued as Patent Number 2,465,902, granted March 29, 1949.

The new compositions forming the subject matter of the present invention are the products obtained by the reaction of a sulfide of phosphorus with polyvalent metal salts of sulfonated phenols, naphthols, and the like having at least one alkyl group attached to the aromatic nucleus. The metal salts which may be used are those in which the hydrogen of both the hydroxy and sulfo groups is replaced by a metal. The reaction for the preparation of the additives may generally be brought about in a solution in lubricating oil or other petroleum oil, whereby concentrates may be prepared which may be conveniently stored or shipped and added to a lubricating oil or other petroleum oil when required.

The exact structure of the compounds obtained by the reaction of a sulfide of phosphorus with metal phenol sulfonates is not fully understood, but it is possible that compounds are formed in which the sulfur and phosphorus atoms are attached directly to the metal atoms.

The metal which is present in the salt which is reacted with a sulfide of phosphorus in accordance with the present invention may be any polyvalent metal, but a highly preferred group of salts are those containing divalent metals of group II of the periodic table, especially the alkaline earth metal salts, that is, those of calcium, barium, strontium and magnesium. The salts of zinc, aluminum, tin, cobalt and nickel are also particularly desirable.

Broadly stated, the new class of compositions may be defined as the products obtained by reaction of a sulfide of phosphorus with a polyvalent metal salt of a compound of the formula

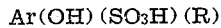

Ar(OH)(SO₃H)(R)

where Ar is an aromatic nucleus containing not more than 12 carbon atoms, R represents one or more alkyl groups, and in which the hydrogen of both the —OH and —SO₃H groups is replaced by a metal. The aromatic nucleuse of the compound may be a single ring nucleus such as the benzene nucleus, or a double ring structure, such as biphenyl, or it may be a condensed nucleus, such as the naphthalene nucleus. The alkyl radical or radicals may be short or long, straight chain or branched, and is preferably of sufficient length to impart oil solubility. Long straight chain groups derived from petroleum waxes may be used, and for certain purposes long branched chain groups are preferred. Mixed metal double salts may also be prepared in which the sulfonic acid hydrogen has been replaced by one metal, such as zinc, and the hydroxyl hydrogen by a different metal, such as barium.

Among the more preferred starting materials in the preparation of the new compositions are phenol, cresol, tert.-butyl phenol, tert.-octyl phenol, petroleum phenols, naphthols, and the like.

Phenol sulfonic acids to be used in the present invention may be prepared by reacting a phenol, naphthol, or the like with an olefin or olefin polymer in a hydrocarbon oil solution, while gradually adding sulfuric acid under controlled temperature conditions. In this method of preparation the sulfuric acid serves both as an alkylation catalyst and as a sulfonating agent. An alternative procedure is first to alkylate the phenol in the presence of a different catalyst and then sulfonate the alkylated phenol with sulfuric acid. Thus, phenol can be alkylated with diisobutylene (the dimer of isobutylene) in the presence of stannic chloride and hydrogen chloride, or with a mixed butene polymer of 16 to 20 carbon atoms, using an AlCl₃-HCl catalyst. The alkyl phenol is then sulfonated as described above.

The method usually most convenient for preparing polyvalent metal sulfonates is that of converting a sodium sulfonate by double decomposition. For example, a calcium alkyl phenol sulfonate may be prepared by reacting an isopropyl alcohol solution of calcium chloride with an alcoholic-naphtha solution of sodium alkyl phenol sulfonate.

In accordance with the present invention, the metallic salt of a phenol sulfonic acid or related compound is caused to react with a sulfide of phosphorus, such as P₂S₅, P₄S₃, or P₄S₇. In carrying out the reaction the proportions of phosphorus sulfide and metal salt of phenol sulfonic acid are so chosen that from 0.05 to 2 atoms of phosphorus are reacted with 1 atom of polyvalent metal, the preferred ratio being within the limits of about 0.2 to 1.2 atoms of phosphorus per atom of metal.

Although the reaction can be brought about by fusing the metal phenol sulfonate with a phosphorus sulfide, it is more convenient to carry out the reaction with the aid of a solvent, preferably a high-boiling hydrocarbon solvent, such as xylol or a petroleum fraction. If a solvent like xylol is employed, heating may be conducted under reflux. After the reaction is complete, the product is filtered and the solvent is removed by evaporation. The completion of the reaction may be determined by immersing a copper strip into the solution, the failure to form a dark stain within a few seconds being an indication of completion. A particularly preferred reaction medium is a lubricating oil fraction, since the final reaction products can thus be obtained as a mineral oil concentrate of the desired additive, which may be conveniently shipped or stored as such and then readily blended with a lubricating oil base stock in the desired concentration to form a finished lubricating oil blend.

In the following examples are described the steps in the preparation of an example of the new compositions of the present invention. It is to be understood that this example is given for illustrative purposes only and is not to be construed as limiting the scope of the invention in any way.

*Preparation of alkylated phenol*

Branched chain $C_{16}$–$C_{20}$ alkyl phenol was prepared in the following manner, using boron fluoride catalyst. 1340 grams of $BF_3$ was injected into 13.2 kg. of phenol which was placed in a glass lined reactor. During a two-hour period 31.4 kg. of butene polymers of 400–600° F. boiling range (obtained from naphtha rerun tower bottoms) was added, the temperature being held at 115° F. maximum during this period and allowed to rise to 120° F. for an additional 4 hour period, the total reaction time being 6 hours. The reaction mixture was then washed 5 times with hot water (170–185° F.), 12 liters of water being used each time. The crude product was then steam distilled up to 400° F. bottoms temperature, the desired alkylated phenols being obtained in 30.7 kg. yield as the bottoms from this distillation. Analysis of the distillate and of the water from the above washing step indicated that 77% of the phenol and 76% of the butene polymer had reacted.

*Sulfonation of alkylated phenol and conversion to calcium salts*

(a) 996 grams of alkylated phenol from Example 1 was dissolved in 640 grams of petroleum naphtha (boiling range 160° to 240° F.) and placed in a reaction flask. Then over a period of 2½ hours 462 grams of sulfuric acid was added drop-wise with stirring, the temperature being maintained at 25° to 35° C. The mixture was stirred for an additional 7 hour period and then allowed to settle overnight. The acid layer was withdrawn and centrifuged. The top layer from this step (volume 52 cc.) was recharged to the reaction mixture along with an additional 36 grams of petroleum naphtha. Then an additional 158 grams of sulfuric acid was added dropwise and stirring was continued for another 8-hour period. After the mixture had been allowed to settle, the acid layer was withdrawn and centrifuged and the top layer of this step again added to the naphtha solution of phenol sulfonic acids.

(b) A solution of sodium methoxide was prepared by adding 93 grams of sodium to 1 liter of methanol. This solution was slowly added to 1116 grams of the naphtha solution of alkylated phenol sulfonic acids from part (a), the addition taking ½ hour. The mixture was stirred for an additional 3-hour period and was then cooled to 80° F. To this was then added a solution of 225 grams of calcium chloride in 2 liters of isopropyl alcohol. There was no appreciable change in temperature. This mixture was then stirred for 2 hours and finally filtered. The filter residue was washed several times with isopropyl alcohol, giving a total filtrate volume of approximately 9 liters. The solvent was removed from the filtrate by evaporation, leaving 550 grams of powdery residue. This residue was redissolved in petroleum naphtha and the solution filtered and the solvent removed from the filtrate by evaporation, giving a final yield of 440 grams of the di-calcium salt of the high molecular weight alkyl phenol sulfonic acids. Analysis of the product: C=59.39%, H=8.72%, S=5.88%, Ca=8.54%.

*Treatment of calcium salt of alkyl phenol sulfonate with phosphorus pentasulfide*

70 grams of the di-calcium alkylated phenol sulfonate prepared in Example 2 was dissolved in 210 grams of xylene. Then 7.8 grams of $P_2S_5$ was added and the mixture heated under reflux for 3½ hours. The reaction product was cooled and filtered and the solvent removed by evaporation and the residue then pulverized. Analysis of the product: Ca=8.10%, P=3.14%, S=8.91%.

The new compositions of matter forming the subject matter of the present invention are useful as addition agents for liquid petroleum products, especially lubricating oils, in which they exhibit antioxidant, corrosion inhibiting, and detergent properties, as is more fully set forth in application Serial Number 598,640.

What is claimed is:

1. As a new composition of matter the product obtained by reacting a sulfide of phosphorus with a group III metal salt of a sulfonated phenol having at least one alkyl group of chain length sufficient to impart oil solubility to said reaction product, said salt having the hydrogen of the —OH and —SO₃H groups replaced by a metal, the amounts of said sulfide of phosphorus and said metal salt being such that from 0.05 to 2 atomic proportions of phosphorus are present for each atomic proportion of metal, and the reaction being conducted by heating the reactants together for a period of time sufficient to cause complete reaction of the sulfide of phosphorus present, as determined by failure of the reaction mixture to produce a dark stain on a bright metallic copper surface within a few seconds.

2. A composition according to claim 1 in which there is attached to the benzene nucleus a single alkyl group of 16 to 20 carbon atoms, in which the sulfide of phosphorus is phosphorus pentasulfide, in which the metal of the metal salt is calcium, and in which the atomic ratio of phosphorus to calcium in the reaction with the phosphorus sulfide is from 0.2 to 1.2.

3. A composition according to claim 1 in which the sulfide of phosphorus is phosphorus pentasulfide.

4. A composition according to claim 1 in which the sulfide of phosphorus is phosphorus pentasulfide and in which the metal of the metal salt is calcium.

5. As a new composition of matter the product obtained by reacting about one-fourth molecular proportion of phosphorus pentasulfide with one molecular proportion of a compound of the formula

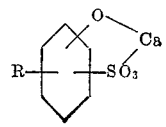

where R is an alkyl group of 16 to 20 carbon atoms, the reaction being carried out by dissolving the calcium alkylated phenate-sulfonate in xylene and refluxing the solution thus formed in the presence of the phosphorus pentasulfide for a period of about 3½ hours.

JOHN G. McNAB.
DILWORTH T. ROGERS.

REFERENCES CITED

The following references are of record in the file of this patent:

UNITED STATES PATENTS

| Number | Name | Date |
| --- | --- | --- |
| 2,350,959 | Cook | June 6, 1944 |
| 2,419,584 | Noland | Apr. 29, 1947 |
| 2,421,004 | Berger | May 27, 1947 |
| 2,465,902 | McNab | Mar. 29, 1949 |